US012005461B1

(12) United States Patent
Sands et al.

(10) Patent No.: US 12,005,461 B1
(45) Date of Patent: Jun. 11, 2024

(54) MIST AND DRINK BOTTLE CAP

(71) Applicants: Michael Edward Sands, Phoenix, AZ (US); Ronald Brian Laikind, Scottsdale, AZ (US); Mark Holzwanger, Hewlett, NY (US)

(72) Inventors: Michael Edward Sands, Phoenix, AZ (US); Ronald Brian Laikind, Scottsdale, AZ (US); Mark Holzwanger, Hewlett, NY (US)

(73) Assignee: Extreme Mist PCS, LLC, Scottsdale, AZ (US)

(*) Notice: Subject to any disclaimer, the term of this patent is extended or adjusted under 35 U.S.C. 154(b) by 0 days.

(21) Appl. No.: 18/125,920

(22) Filed: Mar. 24, 2023

Related U.S. Application Data

(60) Provisional application No. 63/326,879, filed on Apr. 3, 2022.

(51) Int. Cl.

*B05B 11/00* (2023.01)
*B05B 1/10* (2006.01)
*B05B 11/10* (2023.01)

(52) U.S. Cl.

CPC ............ *B05B 11/0086* (2013.01); *B05B 1/10* (2013.01); *B05B 11/0008* (2013.01); *B05B 11/1043* (2023.01)

(58) Field of Classification Search

CPC ... B05B 11/0086; B05B 1/10; B05B 11/0008; B05B 11/1043
See application file for complete search history.

(56) References Cited

U.S. PATENT DOCUMENTS 6,161,777 A * 12/2000 Carter ................. B05B 11/1042 239/289
7,143,958 B1 * 12/2006 Dorney ............... B05B 11/0086 220/705
2006/0273195 A1 * 12/2006 Junkel ................. B05B 11/0005 239/289
2008/0006718 A1 * 1/2008 Junkel ................. B05B 11/0059 239/374
2008/0169575 A1 * 7/2008 Chen ..................... F24F 5/0035 261/78.2
2012/0267400 A1 * 10/2012 Mohr .................. B05B 11/0086 220/288
2014/0014740 A1 * 1/2014 Sands ..................... B05B 3/022 239/289

* cited by examiner

*Primary Examiner* — Vishal Pancholi
(74) *Attorney, Agent, or Firm* — Invention To Patent Services; Alex Hobson

(57) ABSTRACT

The present invention relates to an electric Drink and Mist Bottle Cap apparatus and system. The electric Drink and Mist Bottle Cap apparatus and system allows a user to drink and mist without changing fittings or fitting settings. This invention attaches to existing bottles, delivers a fine mist, and is rechargeable. The present invention allows a user to readily drink and mist from an existing water bottle.

7 Claims, 5 Drawing Sheets

MIST AND DRINK BOTTLE CAP

CROSS-REFERENCE TO RELATED APPLICATION

This patent application claims priority to Provisional Application Ser. No. 63/326,879 filed on Apr. 3, 2022.

TECHNICAL FIELD

The present invention relates to a combined misting and drinking system.

PRIOR ART

The present inventor is not aware of any prior art patents or published patent applications which identically disclose the present invention or would make the present invention obvious.

SUMMARY OF THE INVENTION

The present invention relates to an electric Drink and Mist Bottle Cap apparatus and system.

The Drink and Mist Bottle Cap apparatus and system is the first electric operated mister that you can also drink from the drinkware container without changing misting or drinking components, fittings or fitting settings. The present invention includes a pump, a rechargeable battery, a draw tube in a water tight container, a control board, an ultra-fine removable mist nozzle, a cap on top of the draw tube, a charge port and, adaptors that allow the Drink and Mist Bottle Cap to attach to the top of various bottom containers.

The Drink and Mist Bottle Cap further includes a thread that can be retrofitted to many of the most popular bottles. It is also understood that an adapter will allow mating with various other external containers.

The unique features include:

1. A micro pump (also referred to as pump);
2. A water proof tube for the pump;
3. A high-pressure line;
4. Delivery of mist particles having a diameter within a range of 10 to 100 Microns for an ultra-fine mist;
5. A draw tube with a watertight weighted fighting at the bottom of the tube to capture all the water on the bottom of the bottle;
6. Pump tube positioning/location;
7. The pump and tubing are also located in the casing tube; and
8. The pump housing is integrally formed with no joints.

The prior art in this field that allow combined drinking and misting are typically manually operated. Additionally, other prior art delivers a less fine and higher volume of mist/spray. This causes use of more water while misting/spraying and tends to waste water. The prior art also typically needs to be paired with a specific bottle and cannot be easily retrofitted to existing water bottles.

The Drink and Mist Bottle Cap apparatus and system is an improvement over similar products because it fits to existing water bottles from many different manufacturers, so you do not need to stop using your favorite water bottle. It offers a fine mist that is cooling and designed to not saturate the user. The mist generation is electric, so it is much easier to operate and delivers a continuous cooling mist without the need to manually pump or squeeze it. You can naturally drink, and mist from the same water bottle. The Drink and Mist Bottle Cap apparatus and system has additional unique features that include:

1. A universal thread or thread adapter that can be retrofitted to a multitude of bottles.
2. An electric operated mister that allows a user to mist or drink without changing fittings or fitting settings.
3. A micro pump (also referred to as pump) that delivers up to 70 PSI with a touch of an on/off electrical button/actuator located on the cap for easy access. This micro pump generates the mist. The pump has two speeds approximately at 40 PSI and 60 PSI. The pump is powered by a rechargeable battery. The battery is charged through a mini-USB port located on or in the cap.
4. The pump and battery are located in a waterproof tube that fits to the cap by mechanical means. The tube housing is made to have the lowest profile possible so that it does not displace more than 3 OZ of water when placed into the water.
5. A high-pressure line and/or fitting runs from the pump's output port to a hole in the lid and has threads or other mechanical means to attach an ultra-fine removeable mist nozzle.
6. The pump pressure combined with the mist nozzle design is capable of delivering a mist having particle size in the range of 10 to 100 Microns in diameter while only using about 1 OZ of water for every minute of continuous misting. This mist nozzle design will not over saturate the user or other surfaces with water. Further, the nozzle is a removeable nozzle that can be replaced and cleaned. This is important because in order to achieve 10 to 100 microns, the orifice size must be less than 0.4 millimeter making the nozzle subject to easy clogging.
7. A draw tube is attached to the pump's input port and routed in a fashion to go down the inside of the water-resistant pump tube and out a watertight fighting at the bottom of the tube.
8. The pump tube is positioned to one side of the underneath side of the cap in a way for a drinking port to allow water to flow freely when tipped upside down.
9. The pump and tubing are also located in the casing tube.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
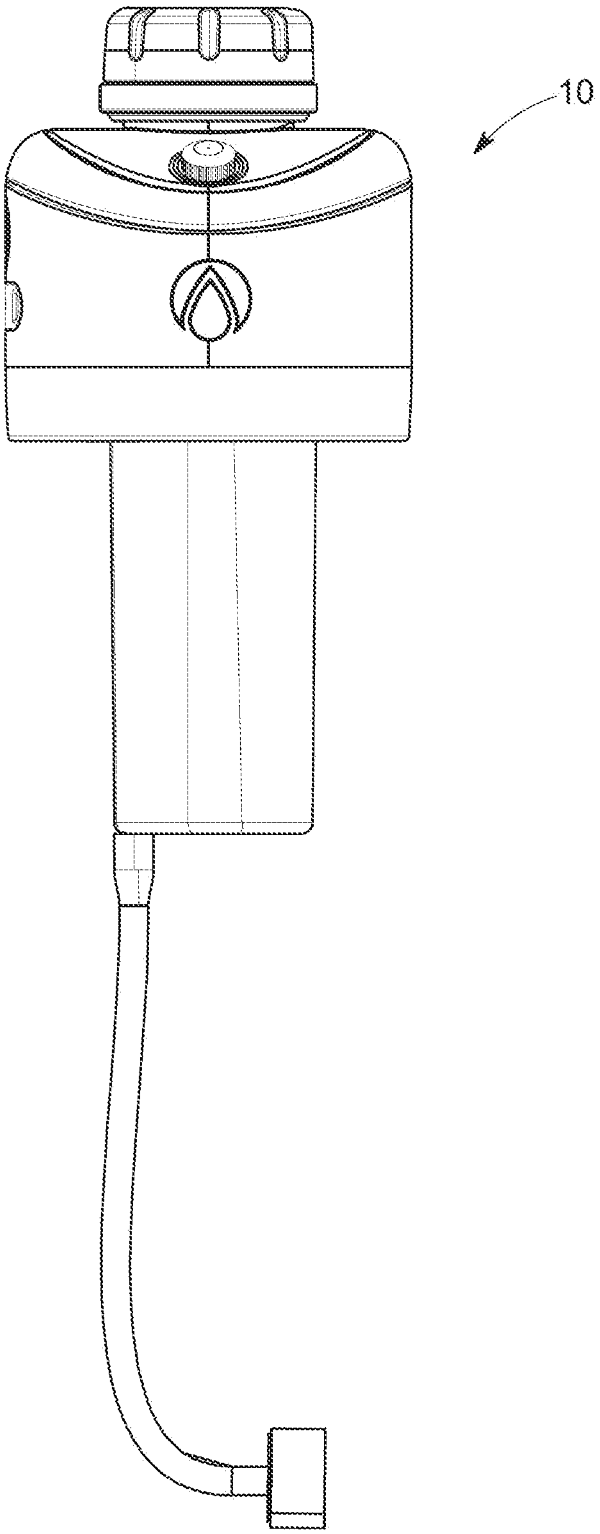
FIG. 1 is a front view of the present invention Mist and Drink Bottle Cap.
Figure 2:
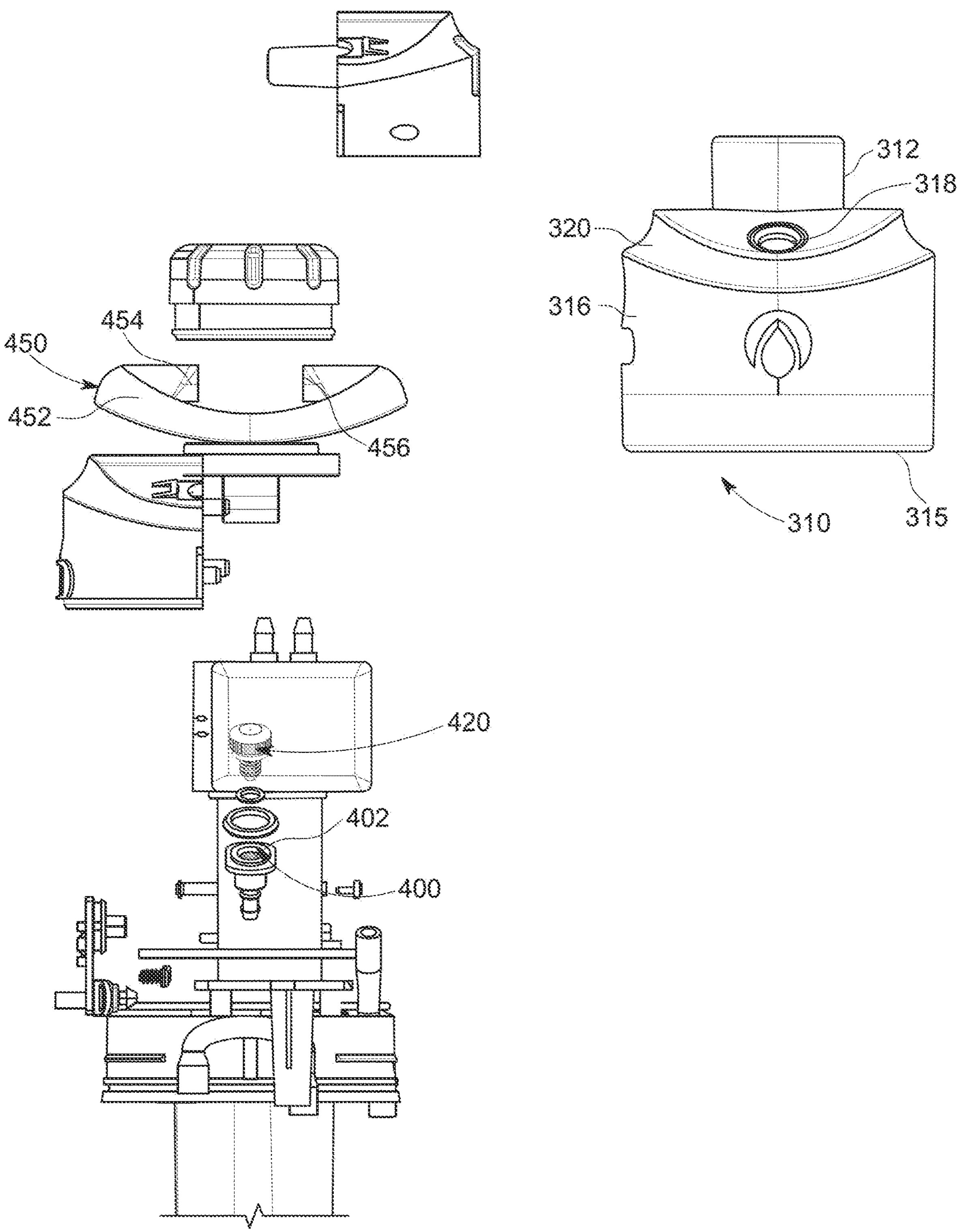
FIG. 2 is an exploded view of the top portion of the present invention Mist and Drink Bottle Cap.
Figure 3:
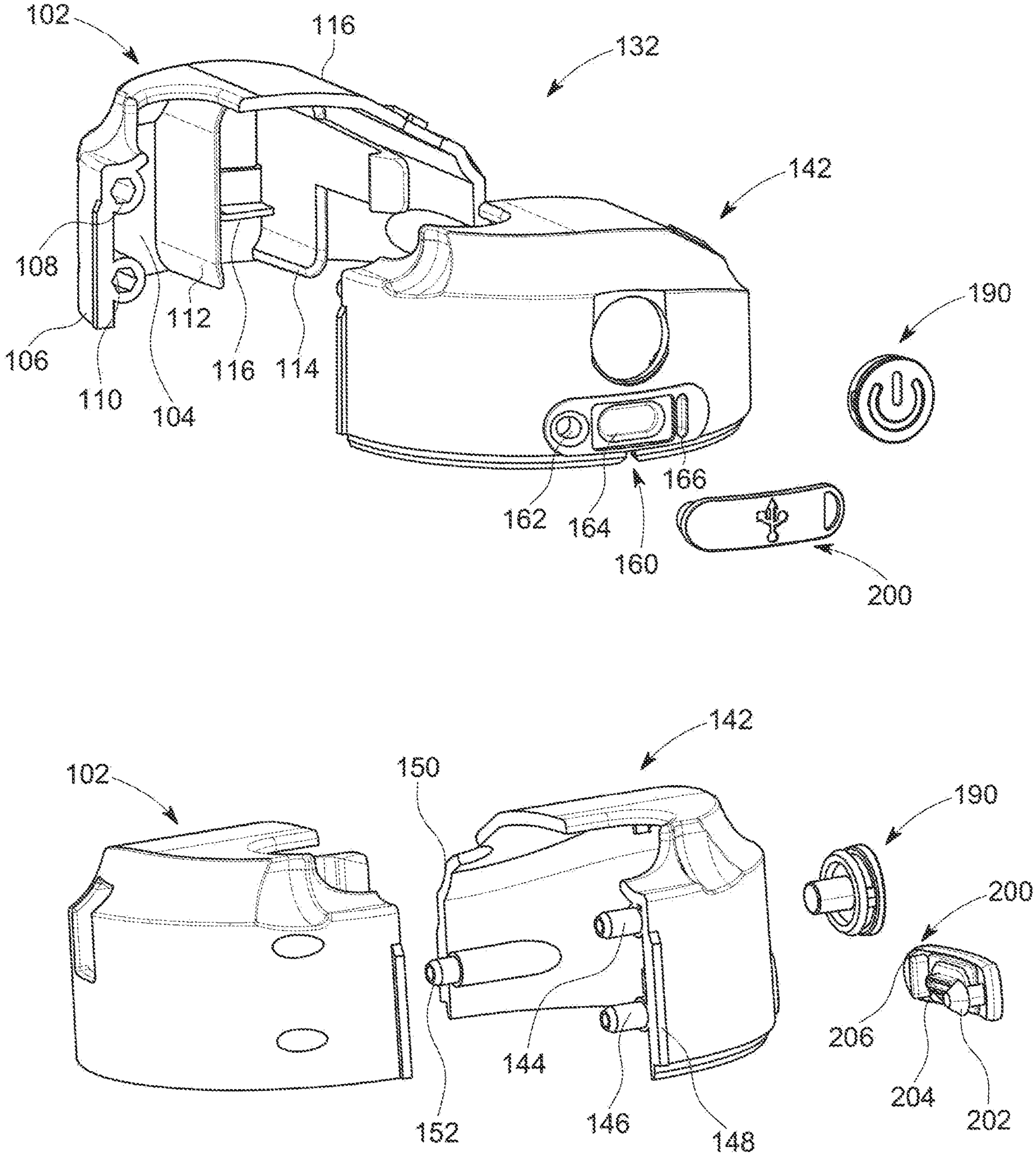
FIG. 3 is an exploded view of the battery housing portion of the present invention Mist and Drink Bottle Cap.
Figure 4:
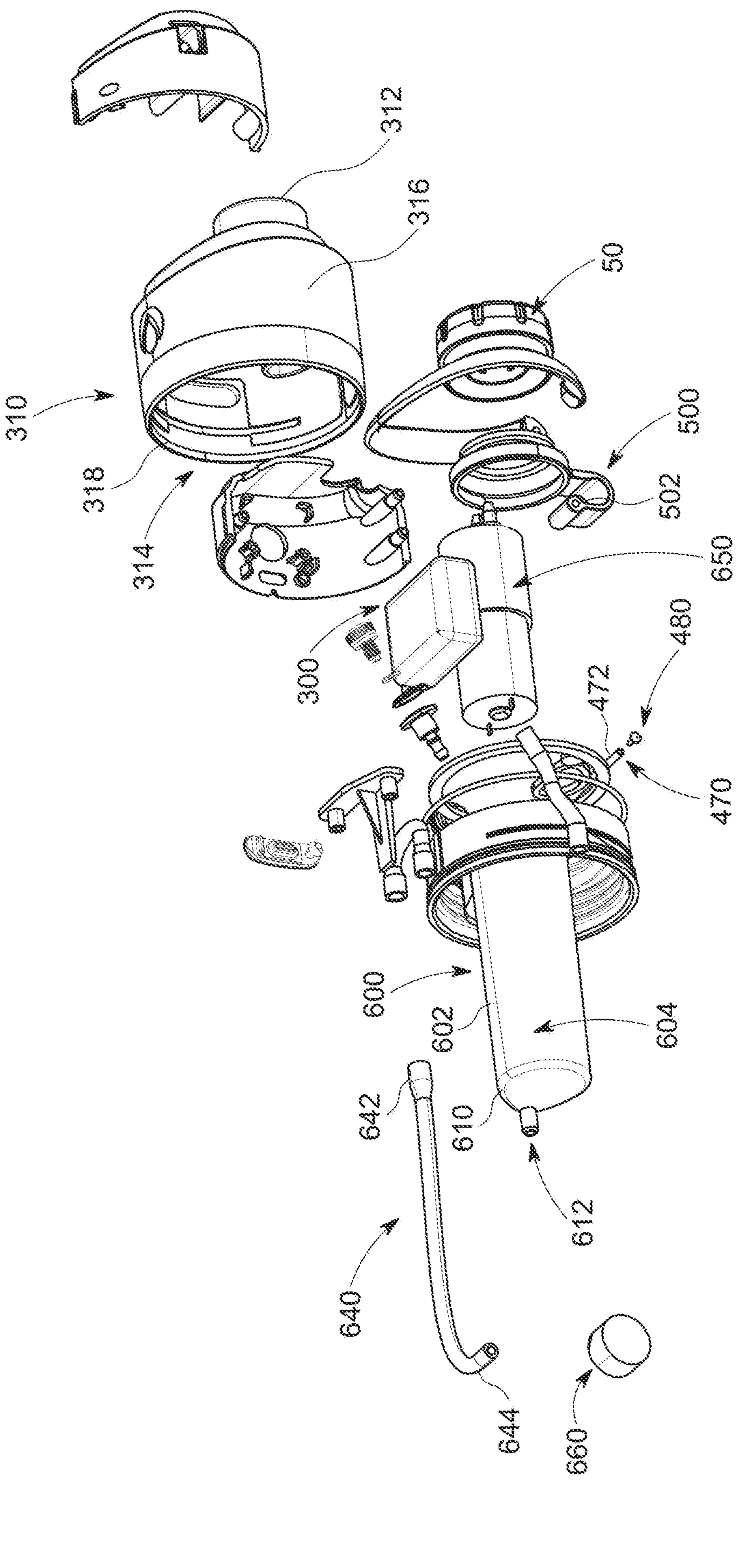
FIG. 4 is an exploded view of the present invention Mist and Drink Bottle Cap.
Figure 5:
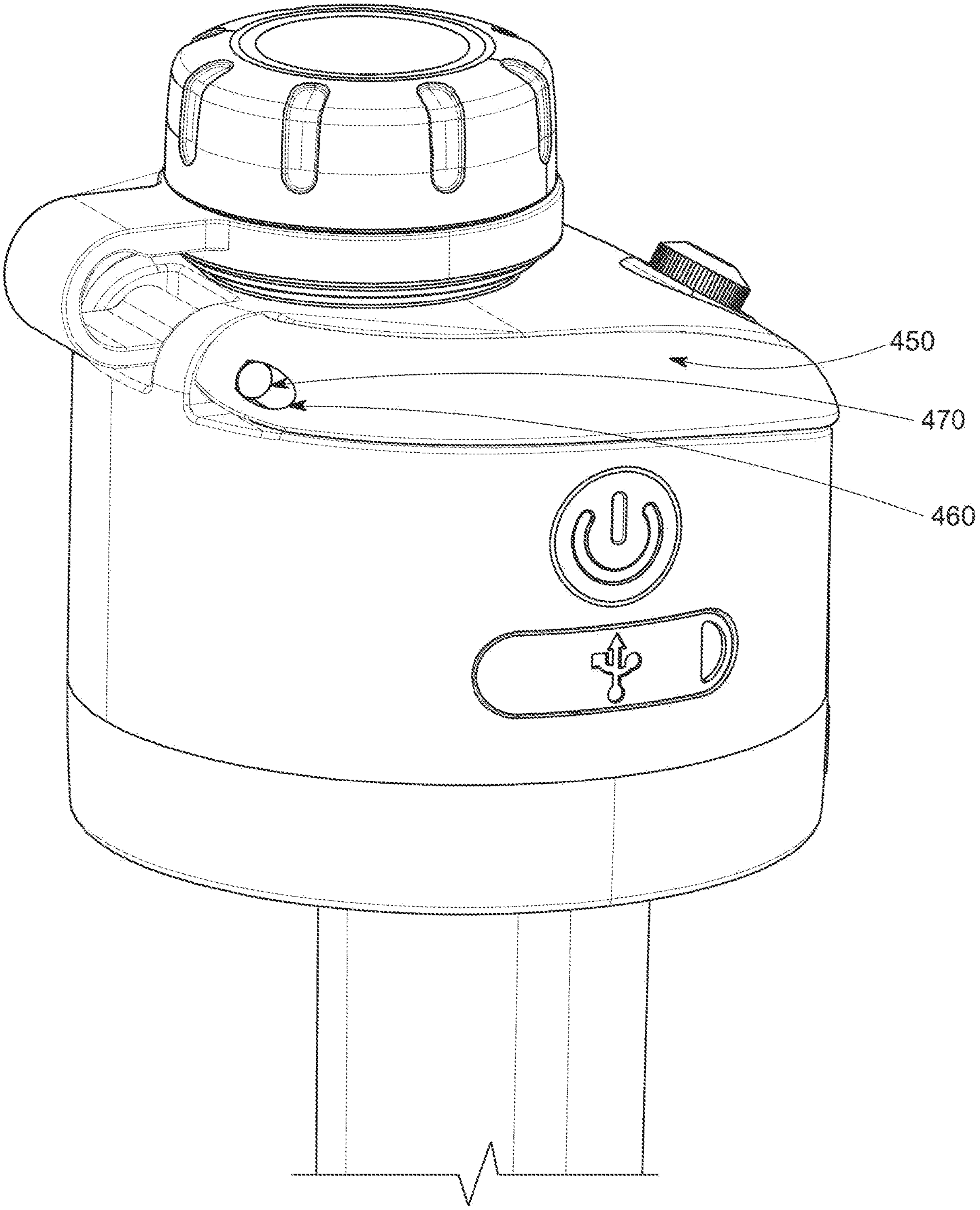
FIG. 5 is a side view top portion of the present invention Mist and Drink Bottle Cap.

Referring to FIGS. 1 to 5, the present invention drink and mist bottle cap 10 comprises an exterior cap 310, a drink spout cap 50, a first semicircular battery housing 102 and a second semicircular battery housing 142 with said first semicircular battery housing 102 having an interior concaved surface 104 and said first semicircular battery housing 102 having a first end 106 having two female openings 108 and 110 sized to receive two male protrusions 144 and 146 affixed to a first end 148 of second semicircular battery housing 142.

Said second semicircular battery housing 142 has a second end 150 having one male protrusion 152 sized to mate with one female opening 132 on second end 116 of first semicircular battery housing 102. Said Interior concaved surface 104 further comprises a first vertical wall 112 a second vertical wall 114, and a horizontal wall 116 extending from said concaved Interior surface 104 with said first vertical wall 112 and said second vertical wall 114 sized to receive a battery 300.

Semicircular battery housing 102 further comprises a Universal Serial Bus (USB) Port Housing 160 having a first circular opening 162, a second horizontal oval opening 164, and a third vertical oval opening 166. The USB Port allows a user to recharge the battery for misting operations. Said USB Port housing is further sized to receive a USB Port water resistant cover 200 having a first frustrum protrusion 202, a second horizontal oval protrusion 204, and a third vertical oval protrusion 206. This forms a water-resistant closure to protect the battery during use but allows user to open for recharging of the battery.

Further referring to FIGS. 1 to 5, said exterior cap 310 has an exterior surface 316, and integrally formed drink spout 312 with said exterior surface 316 having an opening of equal size to nozzle fitting 400. Said nozzle fitting 400 further contains an opening 402 sized to receive removable nozzle 420. Said exterior cap 310 further comprises an upper portion having a concave section 320 sized to receive handle 450 having a convex portion. Rotatable Handle 450 forms a smooth connection to Exterior cap 310 when in the down position. Said handle 450 further comprises a first end 454 and a second end 456 with both first end 454 and second end 456 having a circular opening 460 sized to receive female hinge pin 470. Said female hinge pin 470 has an opening 472 sized to mate and accept male hinge pin 480 to rotatable affix handle 450 to said exterior cap 310.

The present invention drink and mist bottle cap 10, further includes a tether 500 having an opening 502 that is sized to receive said female hinge pin 470 and a cylindrically shaped integrally formed pump housing 600 having an exterior surface 602 and an interior chamber 604 sized to receive pump 650. Said pump housing 600 further has a lower portion 610 having an outlet 612 that is direct connection with first end 642 of intake tube 640. Said intake tube 640 has a lower portion 644 that connects to intake weighted strainer 660. During use the drink and mist bottle cap 10 removable attaches to a separate container (not illustrated) to allow a user to drink or mist. Said Exterior Cap 310 has a lower portion that contains a universal thread 315 for mating with various external bottles. A user can activate the pump by pressing the on/off actuator (also referred to as actuator, or pump actuator) 190. The actuator 190 is controlled by a printed circuit board. Actuator 190 receives a signal from a printed circuit board to turn the pump off by command, turn the pump off if actuator not used after 60 seconds, or control the speed of the pump.

It also understood that an adapter can be used for mating with various diameters for the external bottles. Then, the user may drink by opening the drink spout. Or, the user may activate the misting operation by pressing the pump actuator. When the pump actuator is pressed, the pump is activated causing water to be pulled from the lower container through the tubing to the mist nozzle where the water molecules are atomized to form a mist for the user.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An electric drink and mist bottle cap apparatus comprising:

a) an exterior cap;

b) a drink spout cap;

c) a pump in the drink and mist bottle cap;

d) an actuator to turn the pump on;

e) a battery housing formed by a first semicircular battery housing and a second semicircular battery housing;

wherein said first semicircular battery housing has an interior concaved surface and a first end having two female openings and a second end with one female opening;

wherein said second semicircular battery housing has a first end with two male protrusions and a second end having one male protrusion; and wherein the two female openings of the first semicircular battery housing are sized to receive the two male protrusions of the second semicircular battery housing; and wherein the one male protrusion of the second semicircular battery housing is sized to mate with one female opening on second end of first semicircular battery housing;

wherein said interior concaved surface further comprises:

a first vertical wall, a second vertical wall, and a horizontal wall extending from said concaved interior surface with said first vertical wall and said second vertical wall sized to receive a battery;

said battery housing further comprises a Universal Serial Bus (USB) Port Housing having a first circular opening, a second horizontal oval opening, and a third vertical oval opening;

wherein said USB Port housing is sized to receive a USB port cover having a first frustrum protrusion, a second horizontal oval protrusion, and a third vertical oval protrusion;

wherein said exterior cap has an exterior surface, and an integrally formed drink spout with said exterior surface having an opening sized to receive a nozzle fitting and said nozzle fitting having an opening sized to receive a nozzle;

wherein said exterior cap further comprises an upper portion having a concave section sized and shaped to receive a handle having a convex portion;

wherein said handle further comprising a first end and a second end with both first end and second end having a circular opening sized to receive a female hinge pin with said female hinge pin having an opening sized to mate and accept a male hinge pin to rotatable affix said handle to said exterior cap;

f) a tether having an opening that is sized to receive said female hinge pin;

g) a cylindrically integrally formed pump housing having an exterior surface and an interior chamber sized to receive said pump with said cylindrically shaped integrally formed pump housing having a lower portion having an outlet that is in direct connection with a first end of an intake tube;

said intake tube having a lower portion that connects to an intake weighted strainer; and wherein said drink and mist bottle cap removably attaches to a container to allow a user to drink or mist.

2. The electric drink and mist bottle cap apparatus in accordance with claim 1, further comprising said actuator that receives signals from a printed circuit board to turn the pump off by command, turn the pump off if actuator is not used after 60 seconds, or control the speed of the pump.

3. The electric drink and mist bottle cap apparatus in accordance with claim 1, further comprising said exterior cap that contains a lower portion having a universal thread.

4. The electric drink and mist bottle cap apparatus in accordance with claim 1, further comprising, further comprising an adapter for mating said drink and mist bottle cap to external containers.

5. The electric drink and mist bottle cap apparatus in accordance with claim 1, further comprising, said pump said pump and wherein said removable nozzle delivers a mist with particle size ranging between 10 and 100 microns in diameter when said actuator is pressed.

6. The electric drink and mist bottle cap apparatus in accordance with claim 1, further comprising said pump housing that displaces less than 3 ounces of water when inserted into said container.

7. A drink and mist bottle cap comprising:

a) an exterior cap;

b) a drink spout cap;

c) a pump in the drink and mist bottle cap;

d) an actuator to turn the pump on;

e) a battery housing having an interior surface with a first vertical wall and a second vertical wall sized to receive a battery;

said battery housing further comprising a Universal Serial Bus (USB) Port Housing having at least one opening;

wherein said USB Port housing is sized to receive a USB Port cover having at least one protrusion;

said exterior cap having an exterior surface, and integrally formed drink spout with said exterior surface having an opening sized to receive a nozzle fitting and said nozzle fitting having an opening sized to receive a removable nozzle;

said exterior cap further comprising an upper portion having a section sized and shaped to receive a handle;

said handle further comprising a first end and a second end with both first end and second end having a circular opening sized to receive a hinge pin to rotatable affix handle to said exterior cap;

f) a pump housing having an exterior surface and an interior chamber sized to receive said pump with said pump housing having a lower portion having an outlet that is directly connected with a first end of an intake tube;

said intake tube having a lower portion that connects to an intake weighted strainer;

wherein said drink and mist bottle cap are removably attachable to a container to allow a user to drink or mist.

* * * * *